United States Patent
Liang et al.

(10) Patent No.: US 12,271,242 B2
(45) Date of Patent: Apr. 8, 2025

(54) METHOD FOR CHARGE CONTROL, TERMINAL DEVICE AND STORAGE MEDIUM

(71) Applicant: BEIJING XIAOMI MOBILE SOFTWARE CO., LTD., Beijing (CN)

(72) Inventors: Lei Liang, Beijing (CN); Jiquan Liu, Beijing (CN); Zhichang Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 77 days.

(21) Appl. No.: 17/976,170

(22) Filed: Oct. 28, 2022

(65) Prior Publication Data
US 2024/0019917 A1  Jan. 18, 2024

(30) Foreign Application Priority Data
Jul. 15, 2022  (CN) .......................... 202210833877.3

(51) Int. Cl.
*G06F 1/26* (2006.01)
*H02J 7/00* (2006.01)

(52) U.S. Cl.
CPC .............. *G06F 1/26* (2013.01); *H02J 7/0047* (2013.01); *H02J 7/00712* (2020.01); *H02J 7/00302* (2020.01); *H02J 7/0049* (2020.01); *H02J 7/005* (2020.01); *H02J 7/007182* (2020.01)

(58) Field of Classification Search
CPC ....... G06F 1/26; H02J 7/00302; H02J 7/0047; H02J 7/0049; H02J 7/005; H02J 7/00712; H02J 7/007182
See application file for complete search history.

(56) References Cited

U.S. PATENT DOCUMENTS

2016/0301226 A1* 10/2016 Matsumura ........... H02J 7/0029
2017/0256961 A1*  9/2017 Zeng ................... G01R 31/3842
2022/0043067 A1*  2/2022 Xie .................... G01R 31/3828

OTHER PUBLICATIONS

European Patent Application No. 22204321.8, extended Search and Opinion dated May 31, 2023, 8 pages.

* cited by examiner

*Primary Examiner* — Terrell S Johnson
(74) *Attorney, Agent, or Firm* — Cozen O'Connor

(57) ABSTRACT

A method for charge control, a terminal device and a storage medium. The method includes controlling a charging cut-off function of a PMIC of a terminal device to be in an off state in response to the terminal device being in a charging state; determining a target cell voltage of the terminal device in response to the terminal device being in a cut-off interrupt state; and setting the PMIC based on the target cell voltage to control to continue charging the terminal device until reaching the target cell voltage.

18 Claims, 5 Drawing Sheets

METHOD FOR CHARGE CONTROL, TERMINAL DEVICE AND STORAGE MEDIUM

CROSS REFERENCE TO RELATED APPLICATION

This application is based on and claims priority to Chinese patent application No. 202210833877.3, filed on Jul. 15, 2022, the entire content of which is hereby incorporated into this application by reference

TECHNICAL FIELD

The present disclosure relates to a field of charging technologies, especially to a method for charge control, a terminal device and a storage medium.

BACKGROUND

A terminal device transmits a current input by a charger to a system power supply loop of a terminal through a power management integrated circuit (PMIC) of the terminal, to supply power for the system.

SUMMARY

A method for charge control, a terminal device and a storage medium are provided in the present disclosure.

According to a first aspect of the present disclosure, a method for charge control is provided. The method includes: controlling a charging cut-off function of a power management integrated circuit (PMIC) of a terminal device to be in an off state in response to the terminal device being in a charging state; determining a target cell voltage of the terminal device in response to the terminal device being in a cut-off interrupt state; and setting the PMIC based on the target cell voltage to continue charging the terminal device until reaching the target cell voltage.

According to a second aspect of the present disclosure, a terminal device is provided, and includes: at least one processor; and a memory communicatively connected to the at least one processor and stored with instructions executable by the at least one processor, when the instructions are performed by the at least one processor, the at least one processor is caused to perform: controlling a charging cut-off function of a power management integrated circuit (PMIC) of a terminal device to be in an off state in response to the terminal device being in a charging state; determining a target cell voltage of the terminal device in response to the terminal device being in a cut-off interrupt state; and setting the PMIC based on the target cell voltage to continue charging the terminal device until reaching the target cell voltage.

According to a third aspect of the present disclosure, a non-transitory computer-readable storage medium storing computer instructions is provided, the computer instructions are configured to perform the method as described in any one of the above aspects by a computer.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Figure 1:
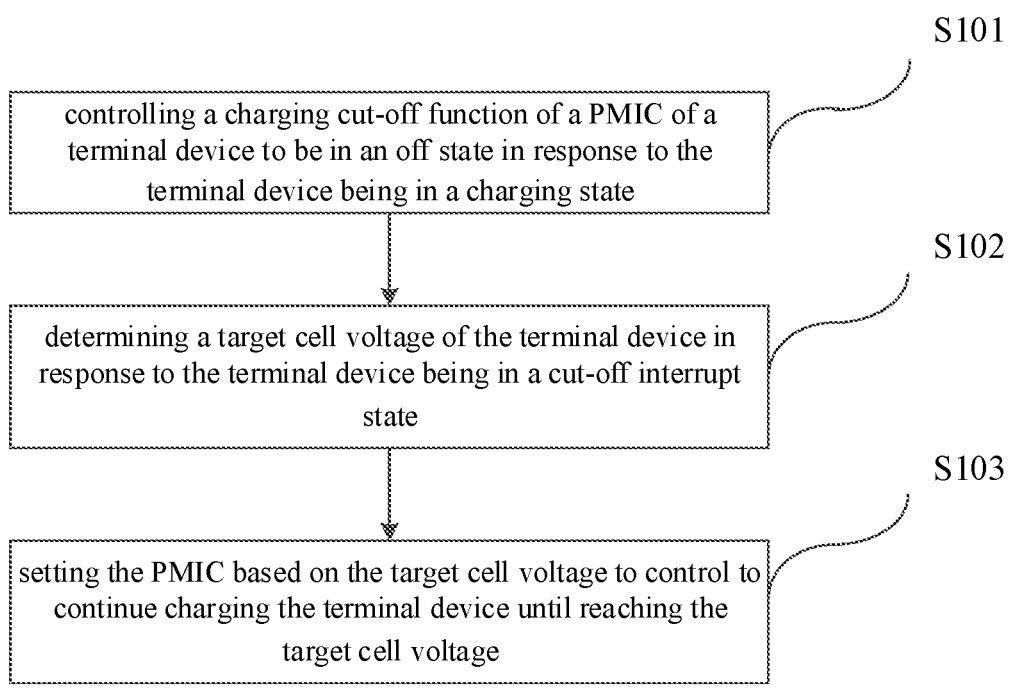
FIG. 1 is a flowchart illustrating a method for charge control in an embodiment of the present disclosure.

FIG. 1 is a flowchart illustrating a method for charge control provided in an embodiment of the present disclosure.

It is noted that, an executive body of the method for charge control in an embodiment may be an apparatus for charge control. The apparatus may be implemented by means of software and/or hardware and may be configured in a terminal device. The terminal device may be a mobile phone, etc.

As illustrated in FIG. 1, the method for charge control may include the following block.

At block S101, a charging cut-off function of a PMIC of a terminal device is controlled to be in an off state in response to the terminal device being in a charging state.

In some embodiments, when a charging device of the terminal device is plugged into a power supply, the terminal device is in the charging state.

In some embodiments, the charging cut-off function of the PMIC refers to that the terminal device stops charging when fully charged starting from a low battery level. Due to an error of a charging voltage of the PMIC, there is an error for a cell voltage when the terminal device is fully charged. On the basis of this, in an embodiment of the disclosure, when the charging device of the terminal device is plugged into the power supply, the charging cut-off function of the PMIC of the terminal device is controlled to be in the off state, such that the terminal device does not determine whether the terminal device is fully charged based on the charging cut-off function of the PMIC.

At block S102, a target cell voltage of the terminal device is determined in response to the terminal device being in a cut-off interrupt state.

In some embodiments, the terminal device is in the cut-off interrupt state, may include a current cut-off interrupt event occurring on the PMIC of the terminal device and an IEOC (cut-off charging current, also referred to as end of charge current or termination current) status register being at a first value. The first value indicates that a charging current drops to an IEOC.

In some embodiments, the current cut-off interrupt event may be configured to indicate detecting whether a present charging current drops to the IEOC in a terminal constant voltage charging stage.

In some embodiments, when a value of the IEOC status register is a first value, it is determined that the present charging current drops to the IEOC. In this case, it is deemed that the battery is fully charged, and the charging may be ended.

In some embodiments, when the value of the IEOC status register is a second value, it is determined that the present charging current does not drop to the IEOC. In this case, it is deemed that the battery is not fully charged, and charging may be continued.

In some embodiments, the first value may be 1, and the second value may be 0.

For example, assuming that the value of the IEOC status register is 1, it is determined that the present charging current drops to the IEOC.

Further, in some embodiments, in response to the terminal device being in the cut-off interrupt state, it is determined that the present charging current drops to the IEOC, and in this case, it is deemed that the battery is fully charged. However, due to the error of the charging voltage of the PMIC, the present cell voltage of the terminal device does not reach a cell voltage at which the battery is actually fully charged. On the basis of this, it is required to determine the target cell voltage of the terminal device, and the target cell voltage is greater than or equal to a present cell voltage, to compensate for charging of the terminal device. The charging cut-off function of the PMIC of the terminal device has been controlled to be in the off state at the block S101, and on the basis of this, in response to the terminal device being in the cut-off interrupt state, charging the terminal device may be continued rather than automatically ended, to reach the target cell voltage of the terminal device. In an implementation, the target cell voltage may be greater than a cell voltage of a constant voltage charging stage.

In some embodiments, in respect to the method for determining the target cell voltage, the part of content will be introduced in subsequent embodiments, which will not be repeated herein.

At block S103, the PMIC is set based on the target cell voltage to control to continue charging the terminal device until reaching the target cell voltage. When the terminal device is charged to the target cell voltage, the charging may end.

In some embodiments, after the target cell voltage is determined at block S102, the PMIC may be set based on the target cell voltage to control to continue charging the terminal device until reaching the target cell voltage. Thus an error of the cell voltage at charging cut-off is reduced, and a loss of an actual voltage of the battery at charging cutoff is reduced.

In one or more embodiments of the present disclosure, the charging cut-off function of the PMIC of the terminal device is controlled to be in the off state in response to the terminal device being in the charging state, and the target cell voltage of the terminal device is determined in response to the terminal device being in the cut-off interrupt state, and the PMIC is set based on the target cell voltage, to control to continue charging the terminal device until reaching the target cell voltage. Therefore, when the terminal device is in the cut-off interrupt state, the target cell voltage of the terminal device is obtained based on the present charging voltage and the present charging current of the terminal device, and the target cell voltage of the terminal device is determined. Charging compensation is performed on the terminal device based on the target cell voltage until reaching the target cell voltage. Thus, an error of the cell voltage at charging cut-off is reduced, and a loss of an actual voltage of the battery at charging cutoff is reduced, which may further solve the problem that the terminal device is not fully charged, prolong a battery life, and solve the problem of abnormal power consumption for a user.

Figure 2:
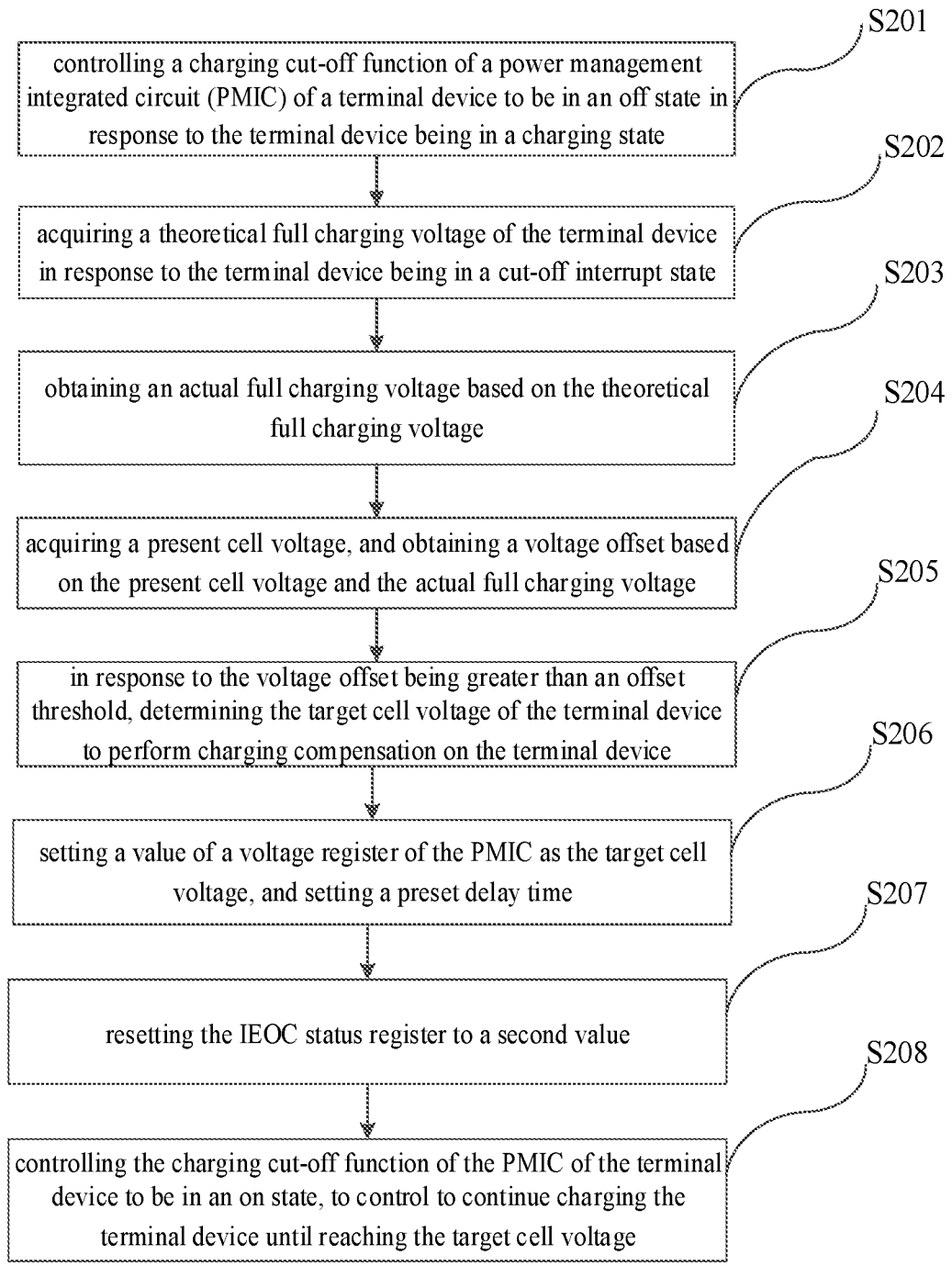
FIG. 2 is a flowchart illustrating a method for charge control in another embodiment of the present disclosure.

FIG. 2 is a flowchart illustrating a method for charge control provided in an embodiment of the present disclosure.

As illustrated in FIG. 2, the method for charge control may include the following blocks.

At block S201, a charging cut-off function of a PMIC of a terminal device is controlled to be in an off state in response to the terminal device being in a charging state.

The explanation of block S201 may refer to the above embodiments, which will not be repeated herein.

At block S202, a theoretical full charging voltage of the terminal device is acquired in response to the terminal device being in a cut-off interrupt state.

In some embodiments, the theoretical full charging voltage is a charging voltage at which the terminal device is theoretically fully charged.

In some embodiments, the theoretical full charging voltage may be directly acquired based on configuration information of the terminal device.

At block S203, an actual full charging voltage is obtained based on the theoretical full charging voltage.

In some embodiments, the actual full charging voltage is a cell voltage at which the terminal device is actually fully charged.

In some embodiments, there is a charging path impedance value in a process of charging the terminal device, a line loss may occur during the process of charging, such that the terminal device may not reach the theoretical full charging voltage.

In some embodiments, the method for obtaining the actual full charging voltage based on the theoretical full charging voltage may include the following blocks.

At block 2031, a present charging path impedance value of the terminal device is obtained based on a present charging voltage and a present charging current of the terminal device.

In some embodiments, the present charging voltage is a voltage presently provided by a charging device for the terminal device.

In some embodiments, the method for obtaining the present charging path impedance value of the terminal device based on the present charging voltage and the present charging current of the terminal device may include the following block.

At block a, a preset number of times of the present charging voltage and the present charging current of a terminal device are acquired, and an average charging voltage and an average charging current are obtained by calculating average values of the acquired voltage and the acquired current respectively.

In some embodiments, the preset number of times may be preconfigured in the terminal device, for example, 10 times.

In some embodiments, the preset number of times of the charging voltage and the charging current may be acquired by a voltameter in a battery pack. In some embodiments, the preset number of times of the charging voltage and the charging current time may be acquired at preset time interval by the voltameter in the battery pack. For example, assuming that the preset time interval is 1 s, the charging voltage and the charging current may be acquired once by the voltameter in the battery pack every 1 s.

At block b, the present charging path impedance value is obtained based on a formula that present charging path impedance value is equal to (=) average charging voltage divided by (÷) average charging current.

In some embodiments, the preset number of times of the present charging voltage and the present charging current of the terminal device are acquired, and the average charging voltage and the average charging current are obtained by calculating the average values of the acquired voltage and the acquired current respectively, such that the present charging path impedance value calculated by the average charging voltage and the average charging current is more accurate.

At block 2032, the actual full charging voltage is obtained based on a formula that actual full charging voltage is equal to (=)theoretical full charging voltage minus (−) present charging path impedance value multiplied by (×) IEOC.

At S204, a present cell voltage is acquired, and a voltage offset is obtained based on the present cell voltage and the actual full charging voltage.

In some embodiments, the present cell voltage is a voltage to which the terminal device is charged presently.

In some embodiments, the voltage offset may be obtained by a formula that actual full charging voltage minus (−) present cell voltage is equal to (=) voltage offset.

For example, assuming that the actual full charging voltage is 4.58 V, and the present cell voltage is 4.46 V, the voltage offset is obtained as 20 mV by 4.48 V−4.46 V=0.02 V.

At S205, in response to the voltage offset being greater than an offset threshold, the target cell voltage of the terminal device is determined to perform charging compensation on the terminal device.

In some embodiments, the offset threshold may be manually set based on requirements, for example, 10 mV.

In some embodiments, the target cell voltage is less than or equal to the actual full charging voltage.

In some embodiments, a method for determining the target cell voltage of the terminal device is related with a capability of the terminal device (for example, hardware). The methods for determining the target cell voltage of the terminal device are different due to different capabilities of the terminal devices, which will be introduced in subsequent embodiments, and will not be repeated herein.

In some embodiments, in response to the voltage offset being less than or equal to the offset threshold, it is deemed that the terminal device has reached the actual full charging voltage, without necessarily performing charging compensation on the terminal device, and the present cell voltage is directly configured as the target cell voltage.

At S206, a value of a voltage register of the PMIC is set as the target cell voltage, and a preset delay time is set.

In some embodiments, the PMIC may configure the target cell voltage as a cell voltage to be reached by the terminal device after the preset delay time.

At S207, the IEOC status register is reset to a second value.

In some embodiments, the IEOC status register is reset to the second value, such that the present charging current does not drop to the IEOC, thus performing charging.

At S208, the charging cut-off function of the PMIC of the terminal device is controlled to be in an on state, to control to continue charging the terminal device until reaching the target cell voltage.

In one or more embodiments of the present disclosure, the charging cut-off function of the PMIC of the terminal device is controlled to be in the off state in response to the terminal device being in the charging state, and the target cell voltage of the terminal device is determined in response to the terminal device being in the cut-off interrupt state, and the PMIC is set based on the target cell voltage, to control to continue charging the terminal device until reaching the target cell voltage. Therefore, when the terminal device is in the cut-off interrupt state, the target cell voltage of the terminal device is obtained based on the present charging voltage and the present charging current of the terminal device, and the target cell voltage of the terminal device is determined. Charging compensation is performed on the terminal device based on the target cell voltage until reaching the target cell voltage. Thus, an error of the cell voltage at charging cut-off is reduced, and a loss of an actual voltage of the battery at charging cutoff is reduced, which may further solve the problem that the terminal device is not fully charged, prolong a battery life, and solve the problem of abnormal power consumption for a user.

Figure 3:
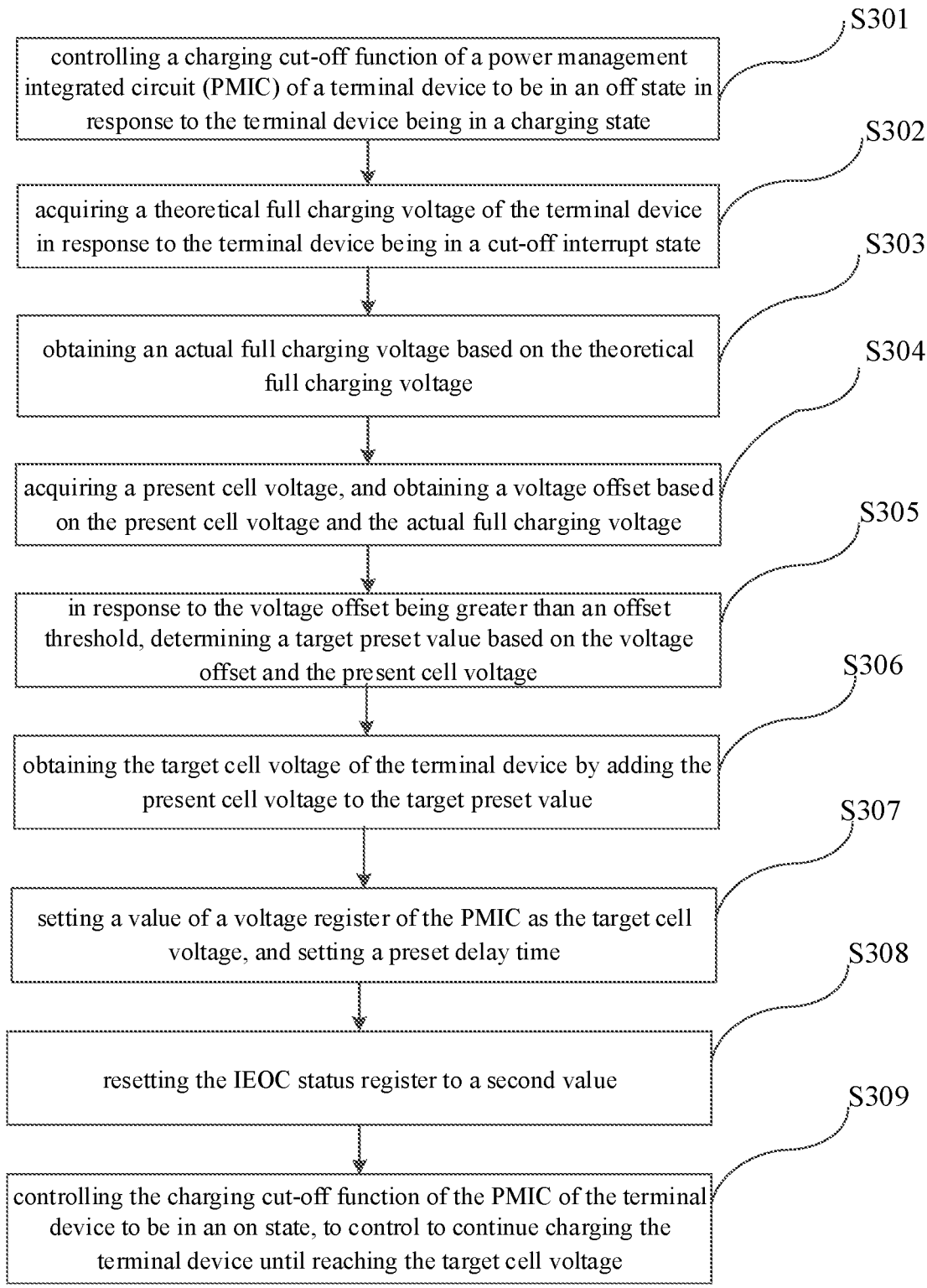
FIG. 3 is a flowchart illustrating a method for charge control in another embodiment of the present disclosure.

FIG. 3 is a flowchart illustrating a method for charge control provided in an embodiment of the present disclosure.

As illustrated in FIG. 3, the method for charge control may include the following blocks.

At block S301, a charging cut-off function of a (PMIC) of a terminal device is controlled to be in an off state in response to the terminal device being in a charging state.

At block S302, a theoretical full charging voltage of the terminal device is acquired in response to the terminal device being in a cut-off interrupt state.

At block S303, an actual full charging voltage is obtained based on the theoretical full charging voltage.

At block S304, a present cell voltage is acquired, and a voltage offset is obtained based on the present cell voltage and the actual full charging voltage.

The explanation of blocks S301 to S304 may refer to the above embodiments, which will not be repeated herein.

At S305, a target preset value is determined based on the voltage offset and a present cell voltage in response to the voltage offset being greater than an offset threshold.

In some embodiments, hardware of the terminal device may configure a voltage based on a unit preset value. The unit preset value is a minimum voltage value that may be configured by the terminal device. On the basis of this, the target preset value may be configured based on the unit preset value.

For example, assuming that the unit preset value is 10 mV, the target preset value may a multiple of the unit preset value, for example, may be 10 mV, or 20 mV.

More specifically, in some embodiments, the method for determining the target preset value based on the voltage offset and the present cell voltage may include the following blocks.

At block 1, it is determined that the target preset value is a first preset value in response to the voltage offset being less than a first threshold and the present cell voltage being greater than a first voltage threshold.

At block 2, it is determined that the target preset value is a second preset value in response to the voltage offset being greater than or equal to the first threshold and less than a second threshold, and the present cell voltage being greater than a second voltage threshold and less than or equal to the first voltage threshold.

At block 3, it is determined that the target preset value is a third preset value in response to the voltage offset being greater than or equal to the second threshold and less than a third threshold, and the present cell voltage being greater than a third voltage threshold and less than or equal to the second voltage threshold.

At block 4, it is determined that the target preset value is a fourth preset value in response to the voltage offset being greater than or equal to the third threshold and less than a fourth threshold, and the present cell voltage being greater than a fourth voltage threshold and less than or equal to the third voltage threshold.

At block 5, it is determined that the target preset value is a fifth preset value in response to the voltage offset being greater than or equal the fourth threshold, and the present cell voltage being less than or equal to the fourth voltage threshold.

In some embodiments, the thresholds corresponding to the above voltage offset correspond to the thresholds corresponding to the present cell voltage one by one, and a sum of the threshold corresponding to the voltage offset and the threshold corresponding to the present cell voltage is the actual full charging voltage. More specifically, the first threshold corresponds to the first voltage threshold, the second threshold corresponds to the second voltage threshold, the third threshold corresponds to the third voltage threshold, the fourth threshold corresponds to the fourth voltage threshold, and the fourth threshold may be a maximum error value of the PMIC, and a sum of the first threshold and the first voltage threshold is the actual full charging voltage.

In some embodiments, the corresponding first threshold may be the unit preset value, and so on, the second threshold may be two (2) times or multiples of the unit preset value, and so on. And, the block of the method for determining the target preset value based on the voltage offset and the present cell voltage may be configured based on the specific unit preset value. In some embodiments, the target preset value may be the unit preset value of a maximum multiple within a range to which the voltage offset belongs.

In some embodiments, the above first threshold is greater than or equal to the offset threshold.

For example, assuming that the actual full charging voltage is 4480 mV, and the unit preset value is 10 mV, the method for determining the target preset value based on the voltage offset and the present cell voltage may include the following blocks.

At block S3051, it is determined that the target preset value is 0 in response to the voltage offset being less than 10 mV and the present cell voltage being greater than 4470 mV.

At block S3052, it is determined that the target preset value is 10 mV in response to the voltage offset being greater than or equal to 10 mV and less than 20 mV, and the present cell voltage being greater than 4460 mV and less than or equal to 4470 mV.

At block S3053, it is determined that the target preset value is 20 mV in response to the voltage offset being greater than or equal to 20 mV and less than 30 mV, and the present cell voltage being greater than 4450 mV and less than or equal to 4460 mV.

At block S3054, it is determined that the target preset value is 30 mV in response to the voltage offset being greater than or equal to 30 mV and less than 40 mV, and the present cell voltage being greater than 4440 mV and less than or equal to 4450 mV.

At block S3055, it is determined that the target preset value is 40 mV in response to the voltage offset being greater than or equal to 40 mV and the present cell voltage being less than or equal to 4440 mV.

For example, assuming that the present cell voltage of the terminal device is 4465 mV, and the voltage offset is equal to 15 mV, it may be determined that the target preset value of the terminal device is 10 mV based on the above method.

In some embodiments, when the unit preset value of the hardware of the terminal device is other value, the target preset value may be determined based on the voltage offset and the present cell voltage referring to the above method.

In some embodiments, when the hardware of the terminal device does not configure a voltage based on the unit preset value, in this case, the target preset value of the terminal device may be a value randomly selected within a range of [voltage offset−offset threshold, voltage offset].

For example, assuming that the actual full charging voltage is 4480 mV, the offset threshold is 10 mV, the present cell voltage is 4460 mV, and the voltage offset is 20 mV, the target preset value may be 15 mV randomly selected within a range of [10 mV, 20 mV].

At S306, the target cell voltage of the terminal device is obtained by adding the present cell voltage to the target preset value.

For example, assuming that the present cell voltage of the terminal device is 4460 mV, and the target preset value obtained based on block S306 is 10 mV, the target preset value of the terminal device may be equal to a sum of the present cell voltage and the target preset value, that is, 4460 mV+10 mV=4470 mV.

At S307, a value of a voltage register of the PMIC is set as the target cell voltage, and a preset delay time is set.

At S308, the IEOC status register is reset to a second value.

At S309, the charging cut-off function of the PMIC of the terminal device is controlled to be in an on state, to control to continue charging the terminal device until reaching the target cell voltage.

The explanation of blocks S307 to S309 may refer to the above embodiments, which will not be repeated herein.

In one or more embodiments of the present disclosure, the charging cut-off function of the PMIC of the terminal device is controlled to be in the off state in response to the terminal device being in the charging state, and the target cell voltage of the terminal device is determined in response to the terminal device being in the cut-off interrupt state, and the PMIC is set based on the target cell voltage, to control to continue charging the terminal device until reaching the target cell voltage. Therefore, when the terminal device is in the cut-off interrupt state, the target cell voltage of the terminal device is obtained based on the present charging voltage and the present charging current of the terminal device, and the target cell voltage of the terminal device is determined. Charging compensation is performed on the terminal device based on the target cell voltage until reaching the target cell voltage. Thus, an error of the cell voltage at charging cut-off is reduced, and a loss of an actual voltage of the battery at charging cutoff is reduced, which may further solve the problem that the terminal device is not fully charged, prolong a battery life, and solve the problem of abnormal power consumption for a user.

Figure 4:
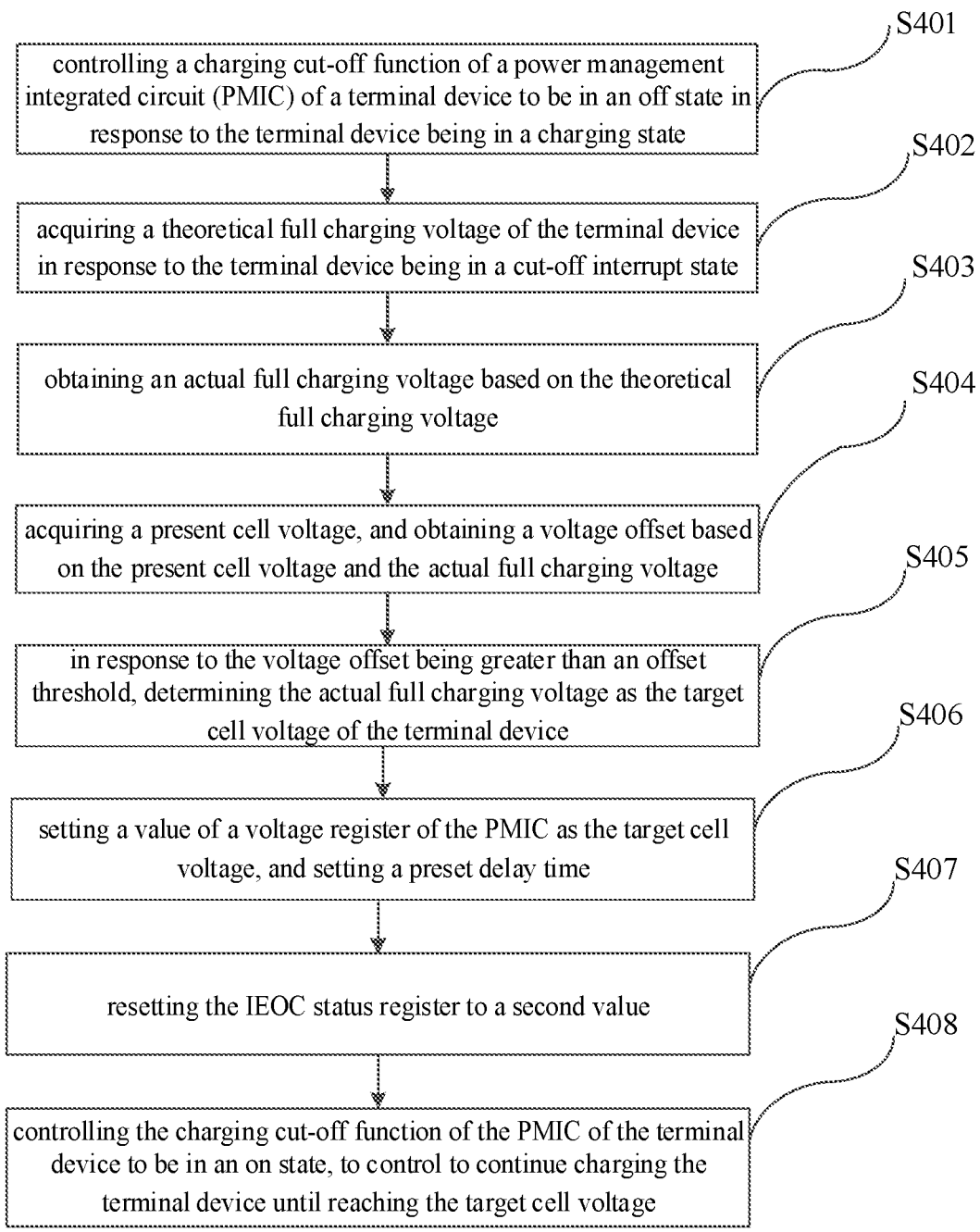
FIG. 4 is a flowchart illustrating a method for charge control in another embodiment of the present disclosure.

FIG. 4 is a flowchart illustrating a method for charge control provided in an embodiment of the present disclosure.

As illustrated in FIG. 4, the method for charge control may include the following blocks.

At block S401, a charging cut-off function of a (PMIC) of a terminal device is controlled to be in an off state in response to the terminal device being in a charging state.

At block S402, a theoretical full charging voltage of the terminal device is acquired in response to the terminal device being in a cut-off interrupt state.

At block S403, an actual full charging voltage is obtained based on the theoretical full charging voltage.

At block S404, a present cell voltage is acquired, and a voltage offset is obtained based on the present cell voltage and the actual full charging voltage.

The explanation of blocks S401 to S404 may refer to the above embodiments, which will not be repeated herein.

At S405, the actual full charging voltage is determined as the target cell voltage of the terminal device in response to the voltage offset being greater than an offset threshold.

In some embodiments, when the hardware of the terminal device may directly configure a cell voltage, the actual full charging voltage is directly determined as the target cell voltage of the terminal device, such that the terminal device is charged at the actual full charging voltage.

At S406, a value of a voltage register of the PMIC is set as the target cell voltage, and a preset delay time is set.

At S407, the IEOC status register is reset to a second value.

At S408, the charging cut-off function of the PMIC of the terminal device is controlled to be in an on state, to control to continue charging the terminal device until reaching the target cell voltage.

The explanation of blocks S406 to S408 may refer to the above embodiments, which will not be repeated herein.

In one or more embodiments of the present disclosure, the charging cut-off function of the PMIC of the terminal device is controlled to be in the off state in response to the terminal device being in the charging state, and the target cell voltage of the terminal device is determined in response to the terminal device being in the cut-off interrupt state, and the PMIC is set based on the target cell voltage, to control to continue charging the terminal device until reaching the target cell voltage. Therefore, when the terminal device is in the cut-off interrupt state, the target cell voltage of the terminal device is obtained based on the present charging voltage and the present charging current of the terminal device, and the target cell voltage of the terminal device is determined. Charging compensation is performed on the terminal device based on the target cell voltage until reaching the target cell voltage. Thus, an error of the cell voltage at charging cut-off is reduced, and a loss of an actual voltage of the battery at charging cutoff is reduced, which may further solve the problem that the terminal device is not fully charged, prolong a battery life, and solve the problem of abnormal power consumption for a user.

Apparatus embodiments of the present disclosure below may be configured to implement the method embodiments of the present disclosure. For details not disclosed in the apparatus embodiments of the present disclosure, please refer to the method embodiments of the present disclosure.

Figure 5:
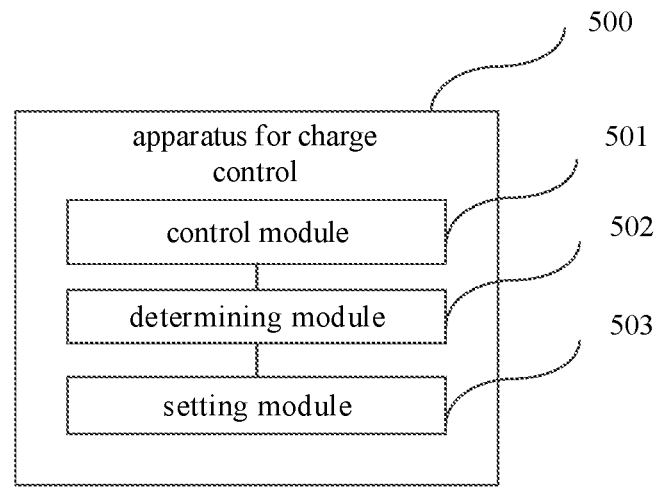
FIG. 5 is a diagram illustrating a structure of an apparatus for charge control in an embodiment of the present disclosure.

FIG. 5 is a diagram illustrating a structure of an apparatus for charge control in an embodiment of the present disclosure. The apparatus for charge control may be implemented as a part or all of an apparatus through software, hardware or their combination. The apparatus 500 for charge control includes a control module 501, a determining module 502, and a setting module 504.

The control module 501 is configured to control a charging cut-off function of a (PMIC) of a terminal device to be in an off state in response to the terminal device being in a charging state.

The determining module 502 is configured to determine a target cell voltage of the terminal device in response to the terminal device being in a cut-off interrupt state.

The setting module 503 is configured to set the PMIC based on the target cell voltage to control to continue charging the terminal device until reaching the target cell voltage.

In an embodiment, the determining module 502 is configured to:
acquire a theoretical full charging voltage of the terminal device, the theoretical full charging voltage is a charging voltage at which the terminal device is theoretically fully charged;
obtain an actual full charging voltage based on the theoretical full charging voltage, the actual full charging voltage is a cell voltage at which the terminal device is actually fully charged;
acquire a present cell voltage, and obtain a voltage offset based on the present cell voltage and the actual full charging voltage, the present cell voltage is a voltage to which the terminal device is charged presently; and
in response to the voltage offset being greater than an offset threshold, determine the target cell voltage of the terminal device to perform charging compensation on the terminal device, wherein, the target cell voltage is less than or equal to the actual full charging voltage.

In an embodiment, the determining module 502 is further configured to: obtain a present charging path impedance value of the terminal device based on a present charging voltage and a present charging current of the terminal device, the present charging voltage is a voltage presently provided by the charging device for the terminal device; and obtain the actual full charging voltage based on a formula that actual full charging voltage is equal to (=) theoretical full charging voltage minus (−) present charging path impedance value multiplied by (×) IEOC.

In an embodiment, the determining module 502 is further configured to: acquire a preset number of times of the present charging voltage and the present charging current of the terminal device, and obtain an average charging voltage and an average charging current by calculating average values of the acquired voltage and the acquired current respectively; and obtain the present charging path impedance value based on a formula that present charging path impedance value is equal to (=) average charging voltage divided by (÷) average charging current.

In an embodiment, the determining module 502 is further configured to: determine a target preset value based on the voltage offset and the present cell voltage; and obtain the target cell voltage of the terminal device by adding the present cell voltage to the target preset value.

In an embodiment, the determining module 502 is further configured to: determine that the target preset value is a first preset value in response to the voltage offset being less than a first threshold and the present cell voltage being greater than a first voltage threshold; determine that the target preset value is a second preset value in response to the voltage offset being greater than or equal to the first threshold and less than a second threshold, and the present cell voltage being greater than a second voltage threshold and less than or equal to the first voltage threshold; determine that the target preset value is a third preset value in response to the voltage offset being greater than or equal to the second threshold and less than a third threshold, and the present cell voltage being greater than a third voltage threshold and less than or equal to the second voltage threshold; determine that the target preset value is a fourth preset value in response to the voltage offset being greater than or equal to the third threshold and less than a fourth threshold, and the present cell voltage being greater than a fourth voltage threshold and less than or equal to the third voltage threshold; and determine that the target preset value is a fifth preset value in response to the voltage offset being greater than or equal to the fourth threshold, and the present cell voltage being less than or equal to the fourth voltage threshold.

In an embodiment, the determining module 502 is further configured to: determine the actual full charging voltage as the target cell voltage of the terminal device.

In an embodiment, the setting module 503 is configured to: set a value of a voltage register of the PMIC as the target cell voltage, and set a preset delay time; reset the IEOC status register to a second value; and control the charging cut-off function of the PMIC of the terminal device to be in an on state, to continue charging the terminal device until reaching the target cell voltage.

In the technical solution of the present disclosure, processings such as acquisition, storage and application of user personal information involved in the present disclosure conform to the provisions of relevant legal regulations, and do not violate the public-order yield.

A terminal device and a readable storage medium are further provided according to embodiments of the present disclosure.

Figure 6:
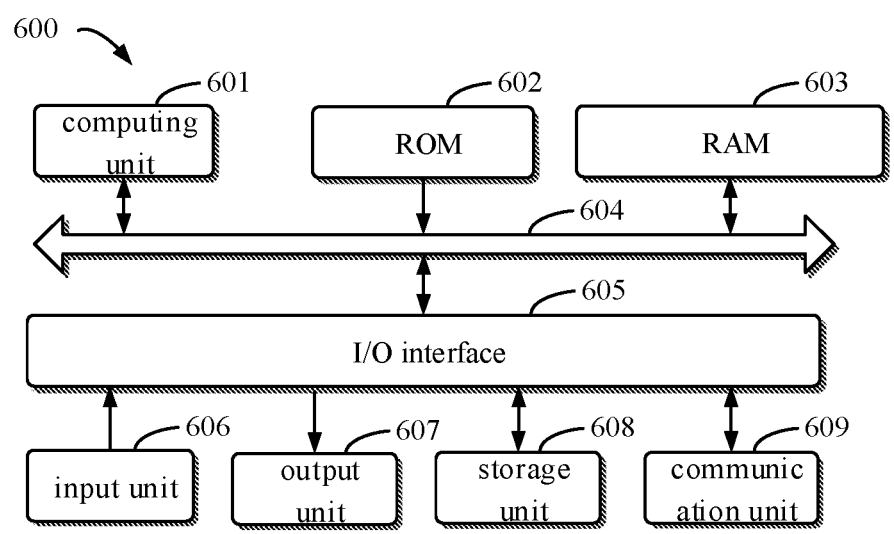
FIG. 6 a block diagram illustrating a terminal device configured to achieve a method for charge control in embodiments of the present disclosure.

FIG. 6 is a block diagram illustrating an example terminal device 600 in an embodiment of the present disclosure. A terminal device is intended to represent various types of digital computers, such as laptop computers, desktop computers, workstations, personal digital assistants, servers, blade servers, mainframe computers, and other suitable computers. A terminal device may also represent various types of mobile apparatuses, such as personal digital assistants, cellular phones, smart phones, wearable terminal devices, and other similar computing devices. The components shown herein, their connections and relations, and their functions are merely examples, and are not intended to limit the implementation of the disclosure described and/or required herein.

As illustrated in FIG. 6, the terminal device 600 includes a computing unit 601, configured to execute various appropriate actions and processes according to a computer program stored in a read-only memory (ROM) 602 or loaded from a storage unit 608 to a random access memory (RAM) 603. In a RAM 603, various programs and data required for the terminal device 600 may be stored. A computing unit 601, a ROM 602 and a RAM 603 may be connected with each other by a bus 604. An input/output (I/O) interface 605 is also connected to a bus 604.

A plurality of components in the terminal device 600 are connected to an I/O interface 605, and includes: an input unit 606, for example, a keyboard, a mouse, etc.; an output unit 607, for example various types of displays, speakers; a storage unit 608, for example a magnetic disk, an optical disk; and a communication unit 609, for example, a network card, a modem, a wireless transceiver. The communication unit 609 allows the terminal device 600 to exchange information/data through a computer network such as internet and/or various types of telecommunication networks and other terminal devices.

A computing unit 601 may be various types of general and/or dedicated processing components with processing and computing ability. Some examples of a computing unit 601 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 601 executes various methods and processes as described above, for example, a method for charge control. For example, in some embodiments, the method for charge control may be further implemented as a computer software program, which is physically contained in a machine readable medium, such as a storage unit 608. In some embodiments, a part or all of the computer program may be loaded and/or installed on the terminal device 600 through a ROM 602 and/or a communication unit 609. When the computer program is loaded on a RAM 603 and executed by a computing unit 601, one or more blocks in the method for charge control as described above may be performed. Alternatively, in other embodiments, the computing unit 601 may be configured to perform a method for charge control in other appropriate ways (for example, by virtue of a firmware).

Various implementation modes of systems and technologies described herein may be implemented in a digital electronic circuit system, an integrated circuit system, a field programmable gate array(FPGA), a dedicated application specific integrated circuit (ASIC), a system on a chip (SoC), a load programmable logic terminal device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in an embodiment of the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or terminal device. A machine-readable medium may be a machine readable signal medium or a machine readable storage medium. A machine readable storage medium may include but not limited to an electronic, magnetic, optical, electromagnetic, infrared, or semiconductor system, apparatus or terminal device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM(an EPROM or a flash memory),an optical fiber device, and a portable optical disk read-only memory(CDROM), an optical storage terminal device, a magnetic storage terminal device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for charge control, comprising:
controlling a charging cut-off function of a power management integrated circuit (PMIC) of a terminal device to be in an off state in response to the terminal device being in a charging state;
determining a target cell voltage of the terminal device in response to the terminal device being in a cut-off interrupt state; and
setting the PMIC based on the target cell voltage to continue charging the terminal device until reaching the target cell voltage;
wherein setting the PMIC based on the target cell voltage to control to continue charging the terminal device until reaching the target cell voltage comprises:
setting a value of a voltage register of the PMIC as the target cell voltage, and setting a preset delay time;
resetting a cut-off charging current (IEOC) status register to a second value; and
controlling the charging cut-off function of the PMIC of the terminal device to be in an on state, to continue charging the terminal device until reaching the target cell voltage.

2. The method of claim 1, wherein the terminal device being in the cut-off interrupt state comprises a current cut-off interrupt event occurring on the PMIC of the terminal device and the cut-off charging current (IEOC) status register being at a first value, wherein, the first value indicates that a charging current of the terminal device drops to an IEOC.

3. The method of claim 1, before determining the target cell voltage of the terminal device, comprising:
acquiring a theoretical full charging voltage of the terminal device, wherein the theoretical full charging voltage is a charging voltage at which the terminal device is theoretically fully charged;
obtaining an actual full charging voltage based on the theoretical full charging voltage, wherein the actual full charging voltage is a cell voltage at which the terminal device is actually fully charged;
acquiring a present cell voltage, and obtaining a voltage offset based on the present cell voltage and the actual full charging voltage, wherein the present cell voltage is a voltage to which the terminal device is charged presently; and
in response to the voltage offset being greater than an offset threshold, determining the target cell voltage of the terminal device to perform charging compensation on the terminal device, wherein, the target cell voltage is less than or equal to the actual full charging voltage.

4. The method of claim 3, wherein obtaining the actual full charging voltage based on the theoretical full charging voltage comprises:
obtaining a present charging path impedance value of the terminal device based on a present charging voltage and a present charging current of the terminal device, wherein, the present charging voltage is a voltage presently provided by a charging device for the terminal device; and
obtaining the actual full charging voltage based on a formula that actual full charging voltage is equal to, =, theoretical full charging voltage minus, −, present charging path impedance value multiplied by, ×, IEOC.

5. The method of claim 4, wherein obtaining the present charging path impedance value of the terminal device based on the present charging voltage and the present charging current of the terminal device comprises:

acquiring a preset number of times of the present charging voltage and the present charging current of the terminal device, and obtaining an average charging voltage and an average charging current by calculating average values of the acquired voltage and the acquired current respectively; and obtaining the present charging path impedance value based on a formula that present charging path impedance value is equal to, =, average charging voltage divided by,÷, average charging current.

6. The method of claim 3, wherein determining the target cell voltage of the terminal device comprises:

determining a target preset value based on the voltage offset and the present cell voltage; and obtaining the target cell voltage of the terminal device by adding the present cell voltage to the target preset value.

7. The method of claim 6, wherein determining the target preset value based on the voltage offset and the present cell voltage comprises:

determining that the target preset value is a first preset value in response to the voltage offset being less than a first threshold and the present cell voltage being greater than a first voltage threshold;

determining that the target preset value is a second preset value in response to the voltage offset being greater than or equal to the first threshold and less than a second threshold, and the present cell voltage being greater than a second voltage threshold and less than or equal to the first voltage threshold;

determining that the target preset value is a third preset value in response to the voltage offset being greater than or equal to the second threshold and less than a third threshold, and the present cell voltage being greater than a third voltage threshold and less than or equal to the second voltage threshold;

determining that the target preset value is a fourth preset value in response to the voltage offset being greater than or equal to the third threshold and less than a fourth threshold, and the present cell voltage being greater than a fourth voltage threshold and less than or equal to the third voltage threshold; and determining that the target preset value is a fifth preset value in response to the voltage offset being greater than or equal to the fourth threshold, and the present cell voltage being less than or equal to the fourth voltage threshold.

8. The method of claim 3, wherein determining the target cell voltage of the terminal device comprises:

determining the actual full charging voltage as the target cell voltage of the terminal device.

9. A terminal device, comprising:

at least one processor; and a memory communicatively connected to the at least one processor and stored with instructions executable by the at least one processor, wherein when the instructions are performed by the at least one processor, the at least one processor is configured to:

control a charging cut-off function of a power management integrated circuit (PMIC) of a terminal device to be in an off state in response to the terminal device being in a charging state;

determine a target cell voltage of the terminal device in response to the terminal device being in a cut-off interrupt state; and set the PMIC based on the target cell voltage to continue charging the terminal device until reaching the target cell voltage;

wherein the at least one processor is configured to:

set a value of a voltage register of the PMIC as the target cell voltage, and setting a preset delay time;

reset a cut-off charging current (IEOC) status register to a second value; and control the charging cut-off function of the PMIC of the terminal device to be in an on state, to continue charging the terminal device until reaching the target cell voltage.

10. The terminal device of claim 9, wherein the terminal device being in the cut-off interrupt state comprises a current cut-off interrupt event occurring on the PMIC of the terminal device and the cut-off charging current (IEOC) status register being at a first value, wherein, the first value indicates that a charging current of the terminal device drops to an IEOC.

11. The terminal device of claim 9, wherein the at least one processor is configured to:

before determining the target cell voltage of the terminal device, acquire a theoretical full charging voltage of the terminal device, wherein the theoretical full charging voltage is a charging voltage at which the terminal device is theoretically fully charged;

obtain an actual full charging voltage based on the theoretical full charging voltage, wherein the actual full charging voltage is a cell voltage at which the terminal device is actually fully charged;

acquire a present cell voltage, and obtaining a voltage offset based on the present cell voltage and the actual full charging voltage, wherein the present cell voltage is a voltage to which the terminal device is charged presently; and in response to the voltage offset being greater than an offset threshold, determine the target cell voltage of the terminal device to perform charging compensation on the terminal device, wherein, the target cell voltage is less than or equal to the actual full charging voltage.

12. The terminal device of claim 11, wherein the at least one processor is configured to:

obtain a present charging path impedance value of the terminal device based on a present charging voltage and a present charging current of the terminal device, wherein, the present charging voltage is a voltage presently provided by a charging device for the terminal device; and obtain the actual full charging voltage based on a formula that actual full charging voltage is equal to, =, theoretical full charging voltage minus, −, present charging path impedance value multiplied by, ×, IEOC.

13. The terminal device of claim 12, wherein the at least one processor is configured to:

acquire a preset number of times of the present charging voltage and the present charging current of the terminal device, and obtain an average charging voltage and an average charging current by calculating average values of the acquired voltage and the acquired current respectively; and obtain the present charging path impedance value based on a formula that present charging path impedance value is equal to, =, average charging voltage divided by, ÷, average charging current.

14. The terminal device of claim 11, wherein the at least one processor is configured to:

determine a target preset value based on the voltage offset and the present cell voltage; and obtain the target cell voltage of the terminal device by adding the present cell voltage to the target preset value.

15. The terminal device of claim 14, wherein the at least one processor is configured to:

determine that the target preset value is a first preset value in response to the voltage offset being less than a first threshold and the present cell voltage being greater than a first voltage threshold;

determine that the target preset value is a second preset value in response to the voltage offset being greater than or equal to the first threshold and less than a second threshold, and the present cell voltage being greater than a second voltage threshold and less than or equal to the first voltage threshold;

determine that the target preset value is a third preset value in response to the voltage offset being greater than or equal to the second threshold and less than a third threshold, and the present cell voltage being greater than a third voltage threshold and less than or equal to the second voltage threshold;

determine that the target preset value is a fourth preset value in response to the voltage offset being greater than or equal to the third threshold and less than a fourth threshold, and the present cell voltage being greater than a fourth voltage threshold and less than or equal to the third voltage threshold; and determine that the target preset value is a fifth preset value in response to the voltage offset being greater than or equal to the fourth threshold, and the present cell voltage being less than or equal to the fourth voltage threshold.

16. The terminal device of claim 11, wherein the at least one processor is configured to:

determine the actual full charging voltage as the target cell voltage of the terminal device.

17. A non-transitory computer-readable storage medium storing computer executable instructions, wherein when executed by a processor, the computer executable instructions are caused to perform:

controlling a charging cut-off function of a power management integrated circuit (PMIC) of a terminal device to be in an off state in response to the terminal device being in a charging state;

determining a target cell voltage of the terminal device in response to the terminal device being in a cut-off interrupt state; and setting the PMIC based on the target cell voltage to continue charging the terminal device until reaching the target cell voltage;

wherein setting the PMIC based on the target cell voltage to control to continue charging the terminal device until reaching the target cell voltage comprises:

setting a value of a voltage register of the PMIC as the target cell voltage, and setting a preset delay time;

resetting a cut-off charging current (IEOC) status register to a second value; and controlling the charging cut-off function of the PMIC of the terminal device to be in an on state, to continue charging the terminal device until reaching the target cell voltage.

18. The storage medium of claim 17, wherein the terminal device being in the cut-off interrupt state comprises a current cut-off interrupt event occurring on the PMIC of the terminal device and the cut-off charging current (IEOC) status register being at a first value, wherein, the first value indicates that a charging current of the terminal device drops to an IEOC.

* * * * *